(12) United States Patent
Mellin et al.

(10) Patent No.: US 6,311,463 B1
(45) Date of Patent: Nov. 6, 2001

(54) ROTARY MOWER CUTTER DISC HAVING SELF-CLEANING KNIFE MOUNT SHIELD

(75) Inventors: Michael James Mellin; John Gregory Petersen; Michael Joseph Verhulst, all of Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/525,638

(22) Filed: Mar. 14, 2000

(51) Int. Cl.[7] ................................................. A01D 75/30
(52) U.S. Cl. ..................................... 56/6; 56/13.6; 56/255
(58) Field of Search .................................. 56/6, 255, 295, 56/503, 504, 13.6, DIG. 17, DIG. 20

(56) References Cited

U.S. PATENT DOCUMENTS

| | | | |
|---|---|---|---|
| 5,784,866 | * | 7/1998 | Campbell et al. ......................... 56/6 |
| 5,842,330 | | 12/1998 | Richardson et al. . |
| 5,845,468 | | 12/1998 | Richardson et al. . |

* cited by examiner

Primary Examiner—Robert E. Pezzuto

(57) ABSTRACT

A rotary cutter disc includes shields for the nuts of the knife mounting bolts. Each shield includes a U-shaped well in which a respective one of the nuts is located, the well being oriented so that its open side is directed away from the center of the disc, whereby centrifugal force ejects crop particles and other matter from the well. In one embodiment, the shield is provided with inclined wear surfaces which also serve as crop guide vanes. In a second embodiment, the shield is integral with a crop guide vane. In each embodiment, the underside of the shield is provided with a locating lug which is adjacent the knife mount bolt hole in the bottom wall of the shield. The disc is provided with an elongated knife mounting bolt hole and the shield locating lug is positioned to enter the elongated hole alongside the knife mounting bolt so as to properly orient the shield and keep the shield from rotating when the mounting bolt nut is being screwed on or off. In the case of the second embodiment, the crop guide vane is also provided with a locating lug that mates with hole provided in the disc.

17 Claims, 2 Drawing Sheets

ROTARY MOWER CUTTER DISC HAVING SELF-CLEANING KNIFE MOUNT SHIELD

The present invention relates to relates to cutter discs for rotary mowers and more specifically relates to replaceable knife mount shields for such cutter discs.

BACKGROUND OF THE INVENTION

The cutter units of a rotary cutterbar operate very close to the ground and include discs that rotate at a high rate of speed so that the knives carried by the discs are able to impact-cut the crop. This combination of low location and high speed results in a high wear rate for the knives. In addition, the knives are also damaged by contact with rocks and other obstacles. It is accepted practice to replace the knives on a regular basis due to wear. So that the nut of the knife mounting bolt does not become damaged, it is known to provide a shield forming a cup or well which surrounds the nut. U.S. Pat. No. 5,845,468, issued on Dec. 8, 1998 to Richardson et al. discloses such a shield. This prior art shield has the drawbacks of being relatively complicated and requiring the disc to be specially designed with a notch to receive the shield. Further, the well of the shield which surrounds the head of the mounting bolt has a tendency to collect crop material which must be cleaned out to permit a socket to engage the nut of the knife mounting bolt whenever it is desired to replace the knife. Also, it is known to equip cutter discs with crop guide vanes or paddles located in the vicinity of the shield which necessitates that the vanes be designed for providing clearance for the shield, an example of such vanes being disclosed in U.S. Pat. No. 5,842,330, issued on Dec. 1, 1998 to Richardson et al.

SUMMARY OF THE INVENTION

According to the present invention there is provided an improved knife mount shield for a rotary mower cutter disc.

An object of the invention is to provide a rotary mower cutter disc assembly including a knife mount shield which is self-cleaning.

A more specific object of the invention is to provide a knife mount shield as set forth in the previous object which includes a well for receiving a knife mounting bolt, the well being open on a radially outer side so that centrifugal force acts to eject crop material from the well.

A further object of the invention is to provide a knife mount shield, as set forth in the previous objects, wherein trailing and leading surfaces of the well are angled such that the leading surface serves to guide cut crop as well as increase the wear life of the shield.

Yet another object of the invention is to provide a knife mount shield which is integral with a crop deflector that has a radially outer end that leads the shield.

Another specific object of the invention is to provide a knife mount shield having a lug arranged next to and in radial alignment with a mounting hole, and to provide the disc with an elongate opening for receiving the lug so that the shield is properly located and prevented from rotating during installation and removal of the knife mounting bolt.

These and other objects of the invention will become apparent from a reading of the ensuing description together with the appended drawings.

DESCRIPTION OF THE PREFERRED EMBODIMENT

Figure 1:
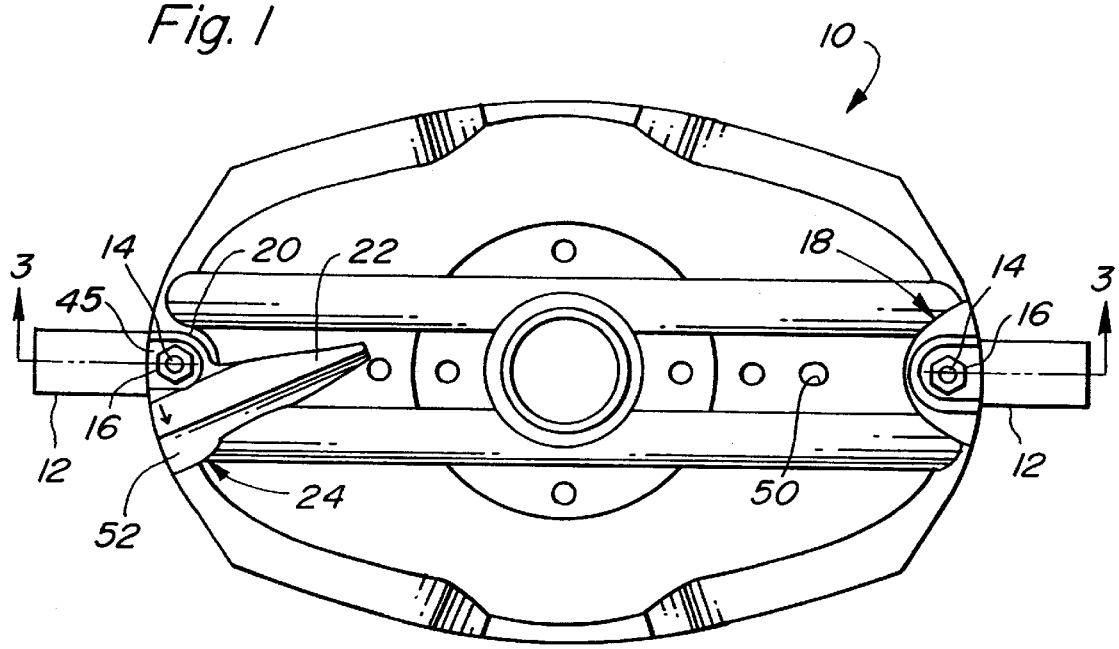
FIG. 1 is a top plan view of a rotary cutter disc showing a knife mount shield alone on the right-hand side of the disc and showing a knife mount shield integral with a crop guide vane on the left-hand side of the disc.
Figure 2:
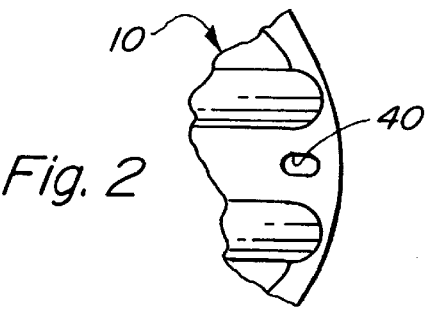
FIG. 2 is a fragmentary top view of the cutter disc showing the elongated knife mounting bolt hole.
Figure 3:
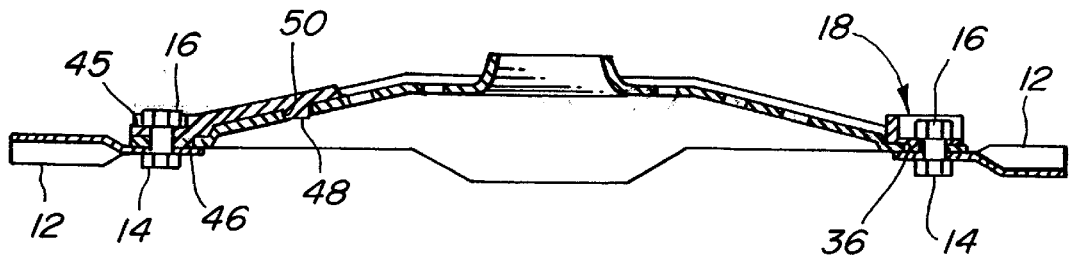
FIG. 3 is a vertical sectional view taken along the line 3—3 of FIG. 1.

Referring now to FIGS. 1–3, there is shown a cutter disc 10 of a type adapted for being driven by spindles forming part of a gear transmission contained in an elongate rotary cutterbar housing. The cutter disc 10 is generally oval shaped in plan view and has cutting knives 12 coupled at opposite ends of the major axis of the disc 10 by respective knife mounting bolts 14 on which are received nuts 16.

For illustration purposes only, the nut 16 of the mounting bolt 14 for the knife 12 shown at the right-hand side of the disc 10 is located within a knife mount shield 18, that is free from any other structure, while the nut 16 of the knife mounting bolt 14 for the knife 12 shown at the left-hand side of the disc 10 is located within a knife mount shield portion 20, that is joined to a crop guide vane portion 22 so as to form an integral shield and crop guide vane element 24. It is to be understood that normally two shields 18 or two integral shield and crop guide vane elements 24 would be used.

Figure 4:
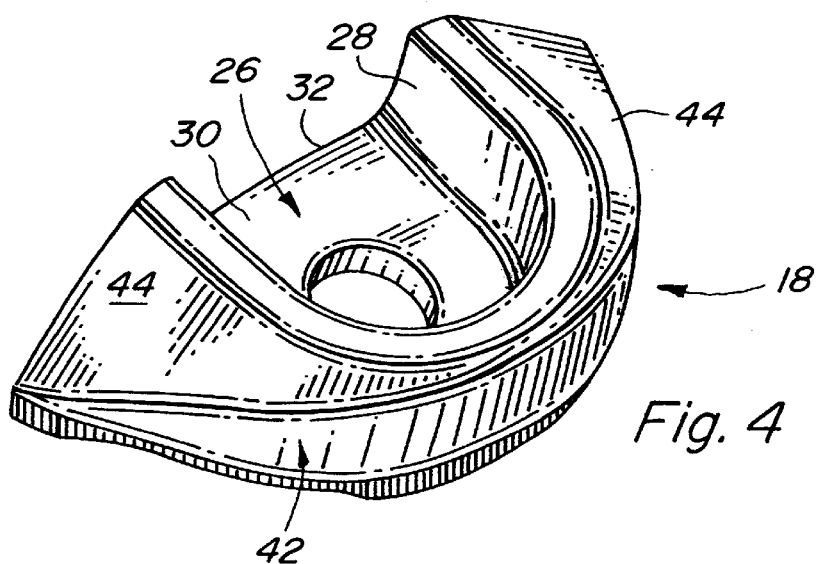
FIG. 4 is a perspective view of the knife mount shield shown in FIG. 1.
Figure 5:
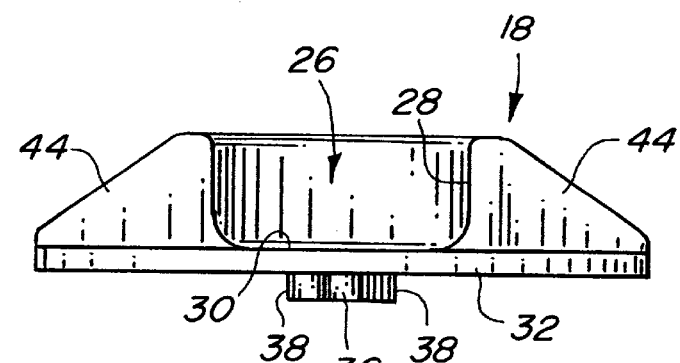
FIG. 5 is an enlarged right side view of the knife mount shield shown in FIG. 1.
Figure 6:
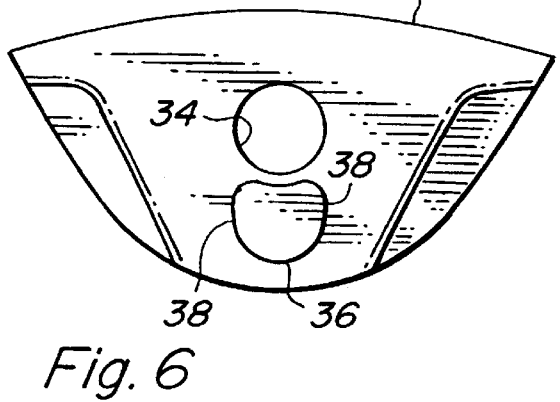
FIG. 6 is a bottom view of the knife mount shield shown in FIG. 5.

The knife mount shield 18 is made as a casting formed symmetrically about a vertical plane, which in FIG. 1, is located along the section line 3—3. Thus, it will be appreciated that the knife mount shield 18 is universal in that it may be used regardless of the working direction of rotation of the disc 10. Referring now also to FIGS. 4–6, it can be seen that the knife mount shield 18 includes a well or recess 26 defined by an upright U-shaped wall surface 28 joined to a horizontal bottom wall 30. When the shield 18 is mounted to the disc 10 for use, the open portion of the wall surface 28 is at the radially outer portion of disc 10 and terminates at a radially outer surface 32 which is formed at a radius substantially equal to that of opposite end portions of the disc 10, which have the axis of rotation of the disc as their center. The bottom wall 30 contains a circular hole 34, located along the plane of symmetry of the shield 18, for receiving the mounting bolt 14, with the nut 16 being located in a centered location of the well 26. The closed end, that is to say the bottom of the U, of the U-shaped wall surface 28 is formed at a radius about the center of the hole 34. Located on the bottom wall 30 of the well 26 just outwardly of the hole 34 is a locating lug 36 having opposite flat sides 38 spaced from each other by a distance substantially equal to the diameter of the hole 34, these sides 38 being parallel to, and located on opposite sides of the plane of symmetry of the shield 18. Knife mounting holes 40 (FIG. 2) are provided at diametrically opposite locations in marginal locations along the major axis of the disc 10 and these holes 40 are elongated along this axis so that each is able to accommodate both of a respective one of the mounting bolts 14 and the locating lugs 36 of the associated shield 18 in adjacent relationship to each other. Thus, the sides 38 of the lug 36 bear against the opposite sides of the elongate hole 40 so as to properly position the shield 18 for operation. Obviously, the locating lug 36 could be located at other locations on the bottom of the shield 18 and a separate hole could be provided in the disc 10 for receiving the lug for establishing the proper positioning of the shield 18. In this case the hole 40 would be made circular.

With reference to FIG. 4, it can be seen that the shield 18 has a wear surface 42 that extends about the perimeter of the well 26. The wear surface 42 includes identical slanted portions 44 that are inclined upwardly toward the top of the well 26, with a top of each portion 44 being close to the top of the shield 18 and with a bottom of each portion 44 converging from the curved side 32 of the shield towards the top at the closed end of the well 26. Because the shield 18 is symmetrical about a vertical plane passing between the legs of the U-shaped well 26, the shield 18 may be used with any disc 10 regardless of the direction of rotation the disc undergoes during operation. Depending on the direction of rotation of the disc 10, one or the other of the slanted portions 44 leads the knife 12 and acts to deflect or guide crop across the cutter disc 10. The slanted portions 44 of the wear surface 42 results in a longer wear life of the shield 18 since impact loads will be less than they would be if directed against an upright surface, as is the case with prior art designs.

Figure 7:
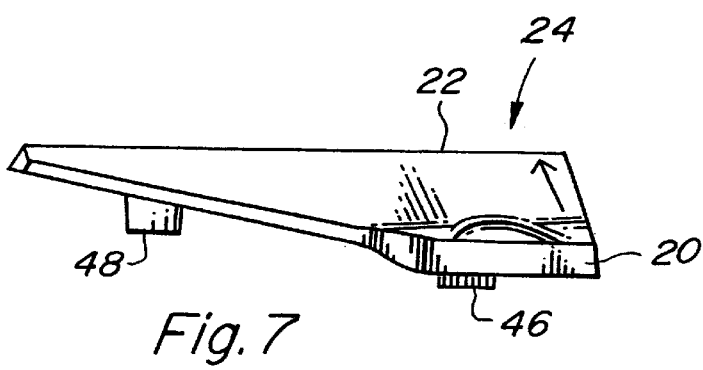
FIG. 7 is a side view of the integrated knife mount shield and crop guide vane shown in FIG. 1.

If it is desired to be able to more aggressively deflect or guide crop than is possible with the wear surface 42 of the shield 18, the disc 10 may be equipped with the integrally cast shield and crop guide vane element 24. As shown in FIG. 1, the integral element 24 is designed for use with a disc 10 that is to be rotated in the counterclockwise direction. Considered relative to this direction of rotation of the disc 10, the guide vane portion 22 of the integral element 24 leads the cutter knife 12 and extends radially inwardly slightly beyond a point where it intersects the radial line which passes through the mounting bolt 14 from the axis of rotation of the disc 10. The shield portion 20 trails the radially outer end of the vane portion 22 and, like the shield 18, the shield portion 20 includes a well 45 that opens radially outwardly relative to the axis of rotation of the disc 10. Referring now also to FIG. 7, it can be seen that, also like the shield 18, the shield portion 20 of the element 24 is provided with a locating lug 46 that enters the elongated mounting hole 40 of the disc radially inwardly of and next to the mounting bolt 14 so as to properly position the element 24 for operation. An additional positioning lug 48 is provided at the underside of the crop guide vane portion 22 at a location which is radially aligned with the lug 46 when the element 24 is mounted to the disc 10, as shown in FIGS. 1 and 3, the lug 48 then being received in a hole 50 provided in the disc 10. The vane portion 22 includes a leading surface 52 which is inclined upwardly away from the direction of rotation and this surface guides crop as well as provides protection for the shield portion 20 of the intergral guide vane and shield element 24.

Thus, it will be appreciated that both the shield 18 and the integral guide vane and shield element 24 will operate such that crop and other material will be moved from the respective wells 26 and 44 by centrifugal force, leaving the wells relatively clear of any crop or other material that would interfere with the removal of the nuts 16 from the mounting bolts 14. Further the respective locating lugs 36 and 46, 48 will serve to properly position the shield 18 and element 24 on the disc 10 while preventing the shield and element from rotating during installation and removal of the bolts 14.

What is claimed is:

1. In a rotary cutter disc including a knife mount shield located at each of diametrically opposite locations adjacent a periphery of the cutter disc, each shield defining a well receiving a nut screwed onto a knife mounting bolt projecting upwardly through aligned holes in a cutter knife, the disc, and each shield and terminating in said well and the associated shield and disc having cooperating surfaces preventing said shield from rotating about said mounting bolt, the improvement comprising: said well of each shield having an open side which is located at said periphery of the cutter disc, whereby centrifugal force will eject crop and other material tending to collect in said well.

2. The rotary cutter disc defined in claim 1 wherein each shield has a tab formed on an underside surface thereof; and said disc having openings respectively receiving the tabs of said shields whereby said tabs cooperate with said openings in said disc so as to properly position said shield.

3. The rotary cutter disc defined in claim 2 wherein said holes in said disc are elongated and respectively form said openings and said tabs being located and shaped for entering said holes adjacent a respective mounting bolt.

4. The rotary cutter disc defined in claim 3 wherein said tab and said hole in each shield are radially aligned with each other relative to an axis of rotation of said cutter disc.

5. The rotary cutter disc defined in claim 1 wherein said shields each include a wear surface which, with respect to a working direction of rotation of said disc, leads, and is inclined upwardly toward, said well, and is oriented so as to serve as a crop guide vane.

6. The rotary cutter disc defined in claim 5 wherein said shields are each symmetrical about a radial line extending from a center of rotation of said disc through said mounting bolts; and said shields each including a second wear surface which trails and is inclined upwardly toward said well, and is oriented so as to serve as a guide vane when utilized with a cutter disc that rotates in a direction opposite from said working direction.

7. The rotary cutter disc defined in claim 1 wherein each shield includes a radially outer surface, which is formed at a radius from a center of rotation of said disc, a radially inner surface which is formed at a radius using the associated bolt as a center; and said well being centered with respect to said radially inner and outer surfaces.

8. The rotary cutter disc defined in claim 1 wherein said shield is integral with a crop guide vane having a radially outer end, which, with respect to a working direction of rotation of said disc, is located in leading relationship to said well and joined to a radially inner end located in trailing relationship to a radial line extending from an axis of rotation of said disc through said mounting bolts.

9. The rotary cutter disc defined in claim 8 wherein each crop guide vane includes a locating lug on an underside thereof; and said disc having a further hole receiving each locating lug.

10. The rotary cutter disc defined in claim 9 wherein said shield includes a second locating lug located on the underside thereof; and said disc being provided with an opening receiving each second locating lug.

11. A shield for use with a knife mounting bolt of a rotary cutter disc, comprising: a body, which, as considered when oriented for use, includes a horizontal bottom wall; a generally U-shaped, upright wall joined to said bottom wall so as to define a well having an open side; and said bottom wall containing a hole located centrally within a closed end portion of said U-shaped wall.

12. The shield defined in claim 11 wherein said body is symmetrical about a vertical plane passing between opposite legs defined by said U-shaped wall.

13. The shield defined in claim 12 wherein said legs each include surfaces which are inclined upwardly toward said well and form crop guide vanes.

14. The shield defined in claim 11 wherein an underside of said body is provided with a locating lug and said underside being horizontal except for said locating lug.

15. The shield defined in claim 11 wherein said shield is formed integrally with a crop guide vane joined to one side of said upright wall and extending generally along a line which intersects with a vertical plane bisecting said well at a location spaced from a closed end of said well.

16. The shield defined in claim 15 wherein an underside of said body is provided with a locating lug.

17. The shield defined in claim 16 wherein an underside of said crop guide vane is provided with a second locating lug.

* * * * *